United States Patent
Liu et al.

(10) Patent No.: US 10,933,610 B2
(45) Date of Patent: Mar. 2, 2021

(54) DISPLAY SCREEN AND SCREEN BODY CUTTING METHOD

(71) Applicant: Yungu (Gu' an) Technology Co., Ltd., Langfang (CN)

(72) Inventors: Jintao Liu, Langfang (CN); Suhua Li, Langfang (CN); Peng Wang, Langfang (CN); Hailiang Liu, Langfang (CN)

( * ) Notice: Subject to any disclaimer, the term of this patent is extended or adjusted under 35 U.S.C. 154(b) by 0 days.

(21) Appl. No.: 16/446,658

(22) Filed: Jun. 20, 2019

(65) Prior Publication Data

US 2019/0299567 A1 Oct. 3, 2019

Related U.S. Application Data

(63) Continuation of application No. PCT/CN2018/113546, filed on Nov. 2, 2018.

(30) Foreign Application Priority Data

May 2, 2018 (CN) .......................... 201810409035.9

(51) Int. Cl.
*B32B 17/10* (2006.01)
*G02B 1/14* (2015.01)
(Continued)

(52) U.S. Cl.
CPC .......... *B32B 17/10073* (2013.01); *B32B 7/12* (2013.01); *B32B 17/10807* (2013.01); *B32B 37/12* (2013.01); *B32B 37/185* (2013.01); *B32B 38/0004* (2013.01); *B32B 38/10* (2013.01); *G02B 1/14* (2015.01); *B32B 2255/205* (2013.01); *B32B 2255/26* (2013.01); *B32B 2255/28* (2013.01); *B32B 2264/105* (2013.01); *B32B 2457/20* (2013.01)

(58) Field of Classification Search
CPC ................................................ B32B 17/10073
USPC ........................................................... 428/80
See application file for complete search history.

(56) References Cited

FOREIGN PATENT DOCUMENTS

| CN | 203063228 U | 7/2013 | |
| CN | 204904239 | * 12/2015 | ............. C03C 17/23 |

(Continued)

OTHER PUBLICATIONS

CN First Office Action with search report dated Apr. 26, 2019 in the corresponding CN application (application No. 201810409035.9).

*Primary Examiner* — Brent T O'Hern
(74) *Attorney, Agent, or Firm* — Kilpatrick Townsend & Stockton (57) ABSTRACT

The application discloses a display screen. The display screen includes a screen body including a cover glass and a substrate glass. The cover glass and the substrate glass each has a bonding surface and an outer surface opposite to the bonding surface. The outer surfaces of the cover glass and the substrate glass are provided with a cracking prevention layer at least in a peripheral region of a predetermined slotted region of the screen body. In a screen body cutting method disclosed in the application, cracking prevention layers are formed on the outer surfaces of both the cover glass and the substrate glass, so as to reduce the edge cracking or breaking of the screen body during the slotting and to reduce crack generated in the cover glass and the substrate glass, thereby improving overall strength of the screen body and increasing the yield of the product.

18 Claims, 6 Drawing Sheets

(51) Int. Cl.
　　*B32B 37/12*　　(2006.01)
　　*B32B 37/18*　　(2006.01)
　　*B32B 38/00*　　(2006.01)
　　*B32B 7/12*　　(2006.01)
　　*B32B 38/10*　　(2006.01)

(56) References Cited

FOREIGN PATENT DOCUMENTS

| CN | 204904239 U | 12/2015 |
| CN | 206209228 U | 5/2017 |
| CN | 108646444 A | 10/2018 |
| CN | 108649137 A | 10/2018 |
| JP | 2007322693 A | 12/2007 |
| JP | 2012185422 A | 9/2012 |
| KR | 20120071095 A | 7/2012 |

* cited by examiner

DISPLAY SCREEN AND SCREEN BODY CUTTING METHOD

CROSS REFERENCE TO RELATED APPLICATIONS

The present application is a continuation application of International Application No. PCT/CN2018/113546, filed on Nov. 2, 2018, which claims the priority to Chinese application No. 201810409035.9, filed on May 2, 2018. Afore-mentioned references are herein incorporated by reference in their entireties.

BACKGROUND

The screen body slotting technology is mainly applied to the research and design of the irregular-shaped screen, so as to increase the screen occupation ratio, to implement a narrow-frame screen and even a full screen. Currently, a variety of products have utilizes the irregular-shaped screen slotting technology to perform mass production.

SUMMARY

Accordingly, it is necessary to provide a display screen and a screen body cutting method to address the problem of the increasing defect rate of the screen body caused by the fact that the cutting route of the irregular-shaped cutting is complicated and the edge cracking or breaking of the glass is easy to occur during slotting.

The present disclosure provides a display screen that includes a screen body having a cover glass and a substrate glass. The cover glass and the substrate glass each has a bonding face and an outer surface opposite to the bonding face. The outer surfaces of the cover glass and the substrate glass are provided with a cracking prevention layer located at least in a peripheral region of a predetermined slotted region of the screen body.

Further, the bonding face of the cover glass is bonded together with the bonding face of the substrate glass.

Further, the cracking prevention layer completely covers the outer surfaces of the cover glass and the substrate glass.

Further, a shape of a projection of the cracking prevention layer on a plane of the screen body is identical to a shape of the screen body removing the predetermined slotted region.

Further, the cracking prevention layer has a portion protruding from an edge of the screen body.

Further, the cracking prevention layer is adhered to the outer surfaces of the cover glass and the base glass.

Further, the cracking prevention layer is an adhesive tape layer, an adhering layer formed by stacking a glue layer and a metal layer, or a mixed layer formed by mixing glue and a metal material.

Further, the cracking prevention layer is an adhering layer formed by stacking a glue layer and a metal layer. The metal layer is a metal mesh layer or a metal sheet layer.

The cracking prevention layers are adhered to the top surface of the cover glass and the outer surface of the substrate glass, so as to reduce the edge cracking or breaking of the screen body during slotting and to reduce crack generated in the cover glass and the substrate glass, thereby improving overall strength of the screen body and increasing the yield of the product.

The present disclosure also discloses a method of cutting a screen body that includes the following steps of:

providing a cover glass and a substrate glass, the cover glass and the substrate glass each having a bonding face and an outer surface opposite to the bonding face, the cover glass and the substrate glass each having a predetermined slotted region, respectively;

providing cracking prevention layers on the outer surfaces of the cover glass and the substrate glass, respectively; and performing a slotting operation at the predetermined slotted region to form a mounting slot.

Further, the step of providing the cracking prevention layers on the outer surfaces of the cover glass and the substrate glass, respectively includes: adhering the cracking prevention layers to the outer surfaces of the cover glass and the substrate glass, and the cracking prevention layers completely cover the outer surfaces of the cover glass and the substrate glass.

Further, prior to the step of performing the slotting operation at the predetermined slotted region to form a mounting slot, the method further includes removing the cracking prevention layer covering the predetermined slotted region.

Further, the step of removing the cracking prevention layer covering the predetermined slotted region includes: first cutting the cracking prevention layer covering the predetermined slotted region and then peeling off the cracking prevention layer covering the predetermined slotted region.

Further, the step of providing the cracking prevention layers on the outer surfaces of the cover glass and the substrate glass, respectively includes: adhering the cracking prevention layer to the outer surfaces of the cover glass and the substrate glass, the cracking prevention layer including a processing slot corresponding to the predetermined slotted region.

Further, a width of the cracking prevention layer is greater than a width of the corresponding cover glass or a width of the corresponding substrate glass, and/or a length of the cracking prevention layer is greater than a length of the corresponding cover glass or a length of the corresponding substrate glass.

Further, after the step of performing a slotting operation at the predetermined slotted region to form a mounting slot, the method further includes the following steps of removing the cracking prevention layer on the outer surfaces of the cover glass and the substrate glass.

Further, after the step of removing the cracking prevention layer on the outer surfaces of the cover glass and the substrate glass, the method further includes the following steps of removing a remaining cracking prevention layer on the outer surfaces of the cover glass and the substrate glass by using alcohol.

Further, prior to the step of providing the cracking prevention layers on the outer surfaces of the cover glass and the substrate glass respectively, the method further includes the following steps of bonding the bonding faces of the cover glass and the substrate glass together.

In the method of cutting the screen body, cracking prevention layers are formed on the top surface of the cover glass and the outer surface of the substrate glass, so as to reduce the edge cracking or breaking of the screen body during the slotting and to reduce crack generated in the cover glass and the substrate glass, thereby improving overall strength of the screen body and increasing the yield of the product.

The present disclosure also discloses a display screen. The display screen is manufactured according to the method of cutting the screen body.

The present disclosure also discloses a display device. The display device is provided with the display screen.

The present disclosure discloses that cracking prevention layers are adhered to a top surface of the cover glass and the outer surface of the substrate glass prior to performing the slotting operation, such that the impact of cutting force on the screen body can be reduced, so as to reduce the edge cracking or breaking of the screen body and to reduce crack generated in the screen body, thereby improving overall strength of the screen body and increasing the yield of the product.

DETAILED DESCRIPTION OF THE EMBODIMENTS

The conventional slotting method of the screen body is mainly irregular-shaped cutting, i.e., cutting an irregular-shaped mounting slot on the screen body. The mounting slot is reserved for devices such as a front camera, a light sensor and a speaker. However, since the cutting route of the irregular-shaped cutting is complicated, the edge of the glass tends to be cracked or broken during slotting, which leads to an increasing defect rate of the screen body.

The above objects, features and advantages of the present disclosure will become more apparent by describing in detail embodiments thereof with reference to the accompanying drawings. A plurality of specific details are set forth in the following description in order to facilitate a thorough understanding of the application. But the application can be embodied in many other ways than those described herein, and those skilled in the art can make similar modifications without departing from the application. Therefore the application is not limited by the specific embodiments disclosed below.

It should be noted that when an element is referred to as being "fixed" to another element, the element may be directly on the other element or be a central element. When an element is considered to be "connected" to another element, the element may be directly connected to the other element or a central element may exist at the same time.

Unless otherwise defined, all technical and scientific terms used in the disclosure have the same meanings as commonly understood by those skilled in the art. The terms used in the specification of the application are for the purpose of describing specific embodiments only and are not intended to limit the application. The term "and/or" includes any and all combinations of one or more related listed items.

Figure 1:
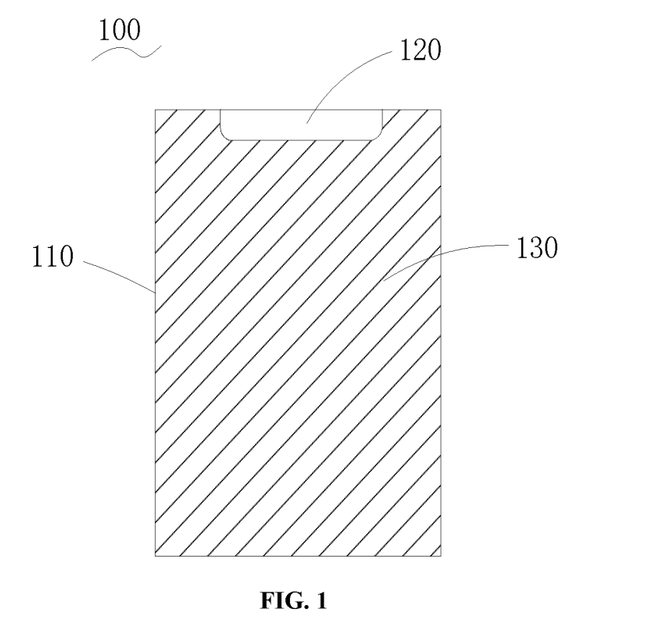
FIG. 1 is a schematic view of a screen body of a display screen according to an embodiment of the present disclosure.
Figure 3:
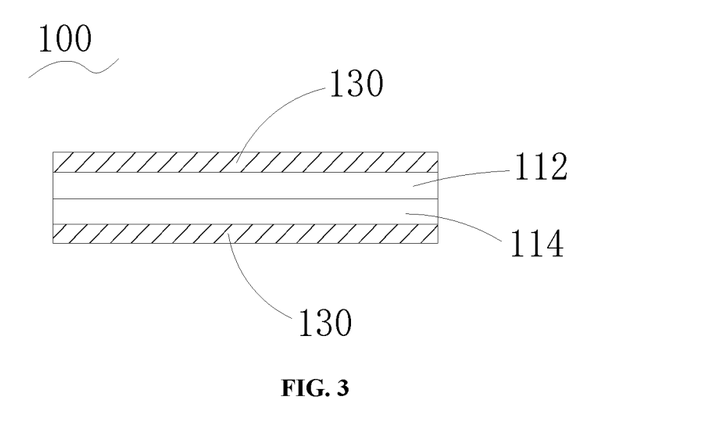
FIG. 3 is a sectional view of a screen body of a display screen according to one embodiment of the present disclosure.

Referring to FIGS. 1 and 3, an embodiment of a display screen 100 is disclosed. The display screen 100 includes a screen body 110, which includes a cover glass 112 and a substrate glass 114 that are bonded together. Specifically, the cover glass 112 and the substrate glass 114 each has a bonding surface and an outer surface opposite to the bonding surface. The bonding surfaces of the cover glass 112 and the substrate glass 114 are bonded together. Of course, in alternative embodiments, an intermediate layer may be sandwiched between the bonding surfaces of the cover glass 112 and the substrate glass 114 that constitute the screen body 110. The outer surfaces of the cover glass 112 and the substrate glass 114 are provided with a cracking prevention layer 130 located at least in a peripheral region of a predetermined slotted region 120 of the screen body. The cracking prevention layer 130 is, for example adhered to the outer surfaces of the cover glass 112 and the substrate glass 114.

By adhering the cracking prevention layer 130 to the peripheral region of the predetermined slotted region 120 of the outer surfaces of the cover glass 112 and the substrate glass 114 of the screen body 110, when slotting the screen body 110, the occurrence of the edge cracking or breaking of the screen body 110 may be effectively reduced, and crack generated in the cover glass 112 and the substrate glass 114 is reduced, thereby improving overall strength of the screen body 110 and increasing the yield of the product. It should be understood that after the screen body 110 is slotted, the cracking prevention layer 130 may be removed in a subsequent operation. The cracking prevention layer 130 may have various configurations, as long as it serves to prevent the edge cracking or breaking of the screen body 110 as much as possible during the slotting process, and is easily removed from the screen body 110 when it is not required to be used.

Figure 4:
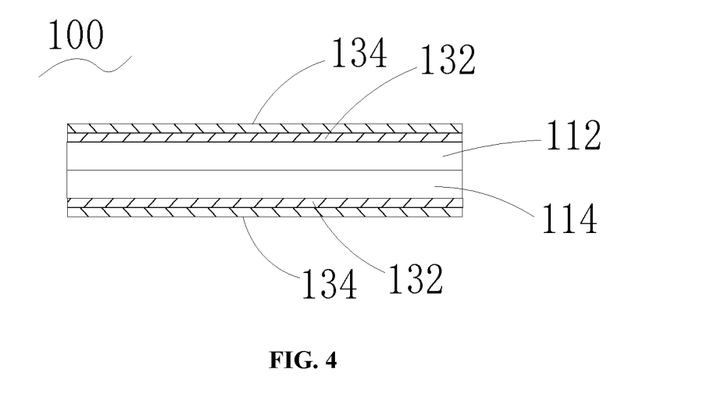
FIG. 4 is a sectional view of a screen body of a display screen according to another embodiment of the present disclosure.
Figure 5:
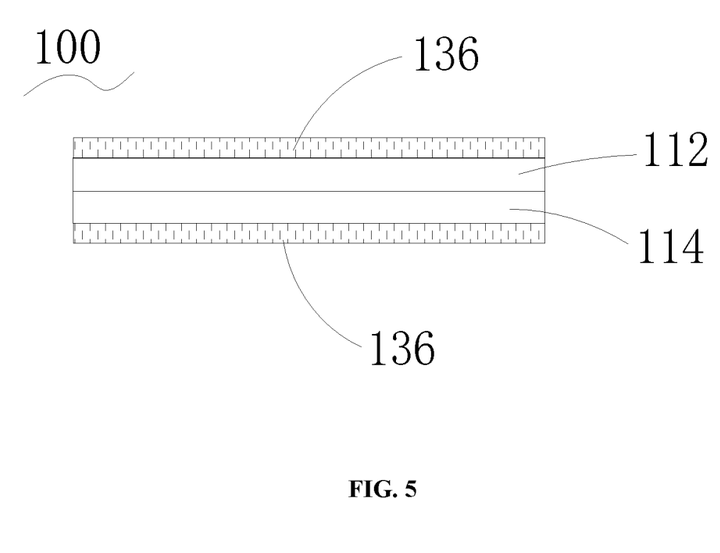
FIG. 5 is a sectional view of a screen body of a display screen according to yet another embodiment of the present disclosure.

FIGS. 3 to 5 illustrate different configurations of the cracking prevention layer 130. Specifically, referring to FIG. 3, the cracking prevention layer 130 is formed by applying a high temperature adhesive tape to the outer surfaces of the cover glass 112 and the substrate glass 114, respectively. Alternatively, referring to FIG. 4, the outer surface of the cover glass 112 is coated with a high-temperature resistant adhesive layer 132, and then a metal layer 134 is coated on the high-temperature resistant adhesive layer 132. The metal layer 134 may be a metal mesh layer or a metal sheet layer. Similarly, the outer surface of the substrate glass 114 is coated with a high-temperature resistant adhesive layer 132, and then a metal layer 134 is coated on the high-temperature resistant adhesive layer 132. The metal layer 134 may be a metal mesh layer or a metal sheet layer, i.e., the cracking prevention layer 130 is an adhering layer formed by stacking a high-temperature resistant glue layer and a metal layer. Further alternatively, referring to FIG. 5, a mixed layer 136 is formed by doping metal particles or metal sheets into the glue, and the mixed layer 136 is adhered to the outer surfaces of the cover glass 112 and the substrate glass 114, respectively, meaning the cracking prevention layer 130 is formed by the mixed layer 136. Of course, the cracking prevention layer 130 of the disclosure is not limited to the three forms, and other cracking prevention layers 130 capable of reducing the edge cracking or breaking of the screen body 110 are also within the scope of protection of the application.

The predetermined slotted region 120 of the screen body 110 is used to form a mounting slot after material is removed. The mounting slot extends through the cover glass 112 and the substrate glass 114. The mounting slot can be used to place devices like a camera, a light sensor, and a speaker. The forming position of the mounting slot is not limited, and can be adjusted according to the production and assembly requirements. In the illustrated embodiment, the mounting slot is located at an edge of one side of the screen body 110.

In the embodiment shown in FIG. 1, the cracking prevention layer 130 is adhered to the outer surfaces of both the cover glass 112 and the substrate glass 114. The cracking prevention layer 130 does not cover all of the outer surfaces of the cover glass 112 and the substrate glass 114, but its shape is identical to a shape of the screen body removing the predetermined slotted region 120, which means, a shape of a projection of the cracking prevention layer 130 on a plane of the screen body 110 is identical to a shape of the screen body removing the predetermined slotted region 120. Therefore, after the cracking prevention layer 130 is adhered to the outer surface of the cover glass 112, the area not covered by the cracking prevention layer 130 is the predetermined slotted region 120. In other words, the cracking prevention layer 130 has a processing slot corresponding to the predetermined slotted region 120 on the screen body 110, and the processing slot is substantially the same in size and shape as the predetermined slotted region 120. Accordingly, when the screen body 110 is slotted, the cover glass 112 and the substrate glass 114 are directly cut at the predetermined slotted region 120 within a range of the processing slot to obtain the mounting slot. In FIG. 1, the processing slot is an opening slot, which may be formed by removing material before the cracking prevention layer 130 is adhered to the screen body 110, or formed by a directly reserved opening when the cracking prevention layer 130 is fabricated. It should be understood that, when the mounting slot corresponding to the predetermined slotted region 120 is an opening slot, the peripheral area of the predetermined slotted region 120 of the screen body 110 does not include the opening area of the opening slot.

Figure 2:
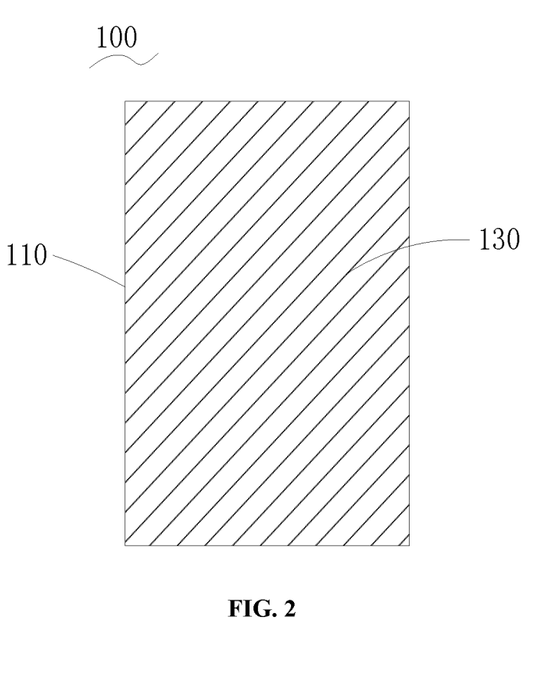
FIG. 2 is a schematic view of a screen body of a display screen according to another embodiment of the present disclosure.

In the illustrated embodiment of FIG. 2, the cracking prevention layer 130 is adhered to the outer surfaces of both the cover glass 112 and the substrate glass 114. The cracking prevention layer 130 completely covers the outer surfaces of the cover glass 112 and the substrate glass 114, and also completely covers the predetermined slotted region 120. When the screen body 110 is slotted, the cracking prevention layer 130, the cover glass 112, and the substrate glass 114 at the predetermined slotted region 120 may be directly cut at the same time to form a mounting slot. Alternatively, the cracking prevention layer 130 at the predetermined slotted region 120 may be cut in advance, and then the cracking prevention layer 130 at the predetermined slotted region 120 may be removed, and then the cover glass 112 and the substrate glass 114 may be cut to obtain the mounting slot. Specifically, the cracking prevention layer 130 covering the predetermined slotted region 120 can be cut by computerized numerical control (CNC) machine tools, such that the cutting accuracy can be improved. Then the cracking prevention layer 130 at the predetermined slotted region 120 can be removed by a film peeling machine. In addition, during cutting by the CNC, the hardness of the used cutting tools is great than that of the cracking prevention layer 130 and is far lower than that of the screen body 110, thus the surface quality of the screen body 110 will not be affected. By removing the cracking prevention layer 130 of the predetermined slotted region 120 before slotting, problems such as poor cutting and increased burrs can be avoided.

Preferably, the cracking prevention layer 130 has a portion protruding from an edge of the screen body 110, making it convenient for peeling off.

Figure 8:
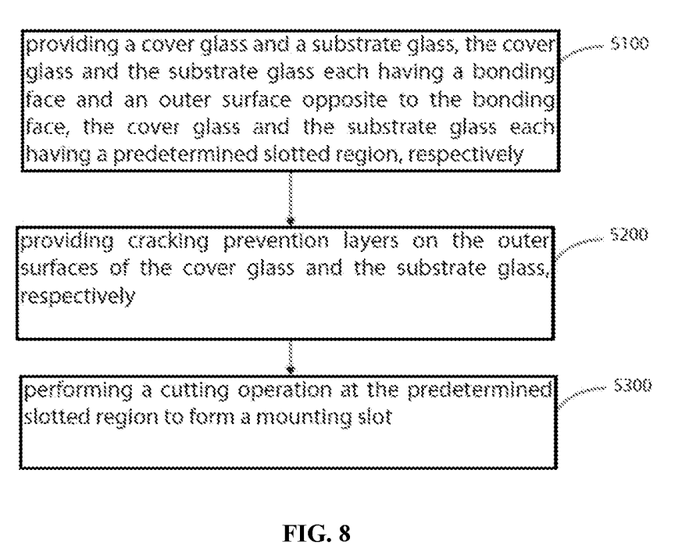
FIG. 8 is a flowchart of a method of cutting a screen body according to one embodiment of the present disclosure.

Referring to FIG. 8, this disclosure also discloses a method of cutting a screen body that includes the following steps of:

In S100, a cover glass 112 and a substrate glass 114 are provided. The cover glass 112 and the substrate glass 114 each has a bonding face and an outer surface opposite to the bonding face. The cover glass 112 and the substrate glass 114 each has a predetermined slotted region, respectively. Preferably, the bonding faces of the cover glass 112 and the substrate glass 114 are bonded together to form the screen body 110 of a display screen. The predetermined slotted regions of the cover glass 112 and the substrate glass 114 correspond to a predetermined slotted region 120 of the screen body 110. In alternative embodiments, the screen body 110 may include an intermediate layer that is sandwiched between the bonding surfaces of the cover glass 112 and the substrate glass 114.

In S200, cracking prevention layers 130 are provided on the outer surfaces of the cover glass 112 and the substrate glass 114, respectively. The cracking prevention layers 130 are located at least in a peripheral region of the predetermined slotted region 120. The cracking prevention layers 130 for example are adhered to the outer surfaces of the cover glass 112 and the substrate glass 114.

In S300, a slotting operation is performed at the predetermined slotted region to form a mounting slot. The screen bod 110 may be slotted by a cutter wheel cutting method or a laser cutting method.

In the aforementioned cutting method of the screen body 110, cracking prevention layers 130 are formed on the outer surfaces of both the cover glass 112 and the substrate glass 114, such that when the screen body 110 is slotted, the occurrence of the edge cracking or breaking of the screen body 110 may be reduced and crack generated in the cover glass 112 and the substrate glass 114 may be reduced, thereby improving overall strength of the screen body 110 and increasing the yield of the product.

In one embodiment, the step of providing the cracking prevention layers 130 on the outer surfaces of the cover glass 112 and the substrate glass 114, respectively includes: adhering the cracking prevention layers 130 to the outer surfaces of the cover glass 112 and the substrate glass 114. The cracking prevention layers 130 completely cover the outer surfaces of the cover glass 112 and the substrate glass 114. Preferably, prior to step S300, i.e., the step of performing the slotting operation at the predetermined slotted region 120, the cracking prevention layer 130 covering the predetermined slotted region 120 of the screen body 110 is removed. Preferably, the step of removing the cracking prevention layer covering the predetermined slotted region 120 of the screen body 110 includes: first cutting the cracking prevention layer 130 covering the predetermined slotted region 120, then separating the cracking prevention layer 130 covering the predetermined slotted region 120 from the cracking prevention layer 130 at other regions, and then peeling off the cracking prevention layer 130 covering the predetermined slotted region.

In another embodiment, the step of providing the cracking prevention layers on the outer surfaces of the cover glass 112 and the substrate glass 114, respectively includes: adhering the cracking prevention layers 130 to the outer surfaces of the cover glass 112 and the substrate glass 114. The cracking prevention layers 130 include a processing slot corresponding to the predetermined slotted region 120. The processing slot could be an opening slot.

In one embodiment, after the step of performing the slotting operation at the predetermined slotted region to form the mounting slot, the method further includes the following steps of removing the cracking prevention layer 130 on the outer surfaces of the cover glass 112 and the substrate glass 114. A film peeling machine may be used to remove the cracking prevention layer 130 at regions of the screen body other than the mounting slot. Of course, the tools for removing the cracking prevention layer 130 are not limited to the film peeling machine used in the embodiment, and an appropriate tool for removing the cracking prevention layer 130 may be selected according to the actual production capacity.

In one embodiment, after the step of removing the cracking prevention layer on the outer surfaces of the cover glass 112 and the substrate glass 114, the method further includes the following steps of removing a remaining cracking prevention layer 130 on the outer surfaces of the cover glass 112 and the substrate glass 114 by using alcohol. If the unremoved cracking prevention layer 130 remains on the outer surfaces of the cover glass 112 and the substrate glass 114, it may be wiped off by alcohol, which has no adverse effect on the cover glass 112 and the substrate glass 114. Of course, other materials capable of removing the cracking prevention layer 130 are also within the scope of the application and are not limited by the present embodiment.

In one embodiment, a width of the cracking prevention layer 130 is greater than a width of the screen body 110, i.e., the width of the cracking prevention layer 130 is greater than a width of the corresponding cover glass 112 or a width of the corresponding substrate glass 114. And/or, a length of the cracking prevention layer 130 is greater than a length of the screen body 110, i.e., the length of the cracking prevention layer 130 is greater than a length of the corresponding cover glass 112 or a length of the corresponding substrate glass 114. The cracking prevention layer 130 has a rectangular shape, and can partially or completely cover the screen body 110 as long as the cracking prevention layer 130 covers the peripheral slot wall of the predetermined slotted region 120 of the screen body 110. Specifically, the case where the cracking prevention layer 130 protrudes from the screen body 110 may be classified into three categories: first, only the width of the cracking prevention layer 130 is greater than the width of the screen body 110; second, only the length of the cracking prevention layer 130 is greater than the length of the screen body 110; third, the width of the cracking prevention layer 130 is greater than the width of the screen body 110 and the length of the cracking prevention layer 130 is greater than the length of the screen body 110.

In other word, the size of the cracking prevention layer 130 can be configured as follows: the size of one side of the cracking prevention layer 130 is larger than the corresponding size of the screen body 110 so that the cracking prevention layer 130 can be more easily captured after the cutting of the screen body 110 is completed, and the remaining cracking prevention layer 130 can be easily removed from the outer surfaces of the cover glass 112 and the substrate glass 114. Of course, the present disclosure is not limited to the embodiment in which the cracking prevention layer 130 is uniformly covered on the screen body 110. In other embodiments, the cracking prevention layer 130 may be formed into an irregular shape, as long as the peripheral slot wall of the predetermined slotted region of the screen body 110 is covered.

In one embodiment, the cracking prevention layer 130 is an adhesive tape layer, an adhering layer formed by stacking a glue layer and a metal layer, or a mixed layer formed by mixing glue and a metal material. The cracking prevention layer 130 serves to share a part of the cutting force when the screen body 110 is slotted, so as to reduce the impact on the screen body 110 by the force applied to the screen body 110, thereby reducing the occurrence of edge cracking or breaking of the screen body 110, further reducing crack generated in the screen body 110 and improving overall strength of the screen body 110.

Figure 6:
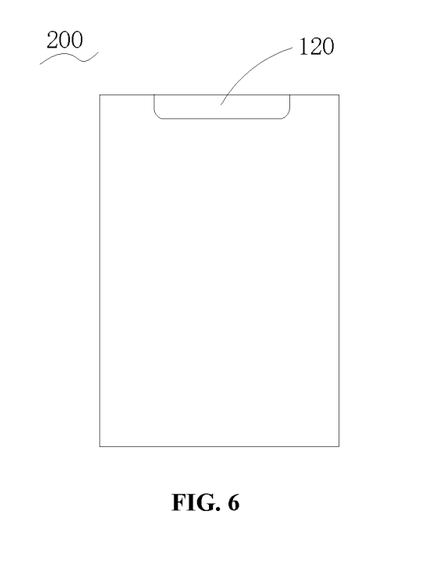
FIG. 6 is a schematic view of another display screen according to one embodiment of the present disclosure.

Referring to FIG. 6, the disclosure also discloses a display screen 200 including the screen body 110 manufactured by the screen body cutting method. The end portion of the screen body 110 is provided with the mounting slot 120 formed by the cutting method of the screen body 110. The mounting slot 120 penetrates the screen body 110.

Specifically, one end portion of the screen body 110 is provided with the mounting slot 120 formed by the cutting method of the screen body 110. The mounting slot 120 can be used for displacing devices such as a camera, a light sensor, and a speaker. The screen body 110 further includes the cover glass 112 and the substrate glass 114 that are bonded together. The mounting slot 120 penetrates the screen body 110, which means the mounting slot 120 penetrates the cover glass 112 and the substrate glass 114. the cracking prevention layer 130 can be completely removed from the surfaces of the cover glass 112 and the substrate glass 114.

The display screen 200 has the mounting slot 120 formed by the screen body cutting method, such that the cover glass 112 and the substrate glass 114 have less crack, the overall strength of the screen body 110 is increased. The quality of the display screen 200 is improved and the working life of the display screen 200 is extended.

Figure 7:
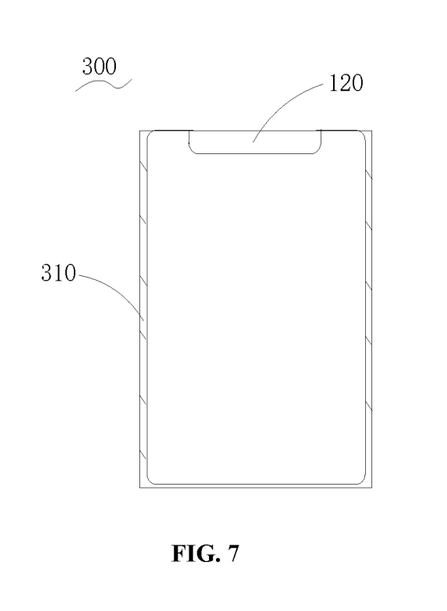
FIG. 7 is a schematic view of a display device according to one embodiment of the present disclosure.

Referring to FIG. 7, the disclosure also discloses a display device 300 including the display screen 200 and a housing 310 that is assembled with the display screen 200 for protecting the display screen 200.

Specifically, the housing 310 wraps the substrate glass 114 in the display screen 200 inside the housing 310 so that the outer surface of the cover glass 112 is exposed to external environment. When the display device 300 is assembled, a polarizer may be added to the outer surface of the cover glass 112, and a layer of protective glass may be added to the polarizer. The housing 310 may surround a contoured edge of the cover glass 112 together, and is coplanar with the outer surface of the cover glass 112. Alternatively, after the edge of the cover glass 112 is surrounded, the outer surface of the cover glass 112 may be covered with a smaller size. The coverage area of the housing 310 is not limited to the contoured edge of the entire display screen, and may be a partial contoured edge of the display screen, such as a symmetrical two-sided contour.

The display device 300 includes the display screen 200 having the mounting slot formed by the screen body cutting method. The cover glass 112 and the substrate glass 114 have less crack, and the overall strength of the screen body 110 is higher. The quality of the display device 300 is improved, and the working life of the display device 300 is extended.

In summary, according to the display screen of the present disclosure, prior to cutting the screen body 110, the cracking prevention layer 130 is adhered to the outer surfaces of the cover glass 112 and the substrate glass 114, and the cracking prevention layer 130 in the forming area of the mounting slot 120 is removed before the slotting operation, so as to reduce the impact of the cutting force on the screen body 110, thereby reducing the occurrence of the edge cracking or breaking of the screen body 110, reducing the crack generated in the screen body 110, improving overall strength of the screen body 110, and increasing the yield of the product.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Although the disclosure is illustrated and described herein with reference to specific embodiments, the disclosure is not intended to be limited to the details shown. Rather, various modifications may be made in the details within the scope and range of equivalents of the claims and without departing from the disclosure. Therefore, the protection scope of the present disclosure shall be subject to the protection scope of the appended claims.

The invention claimed is:

1. A display screen, comprising:
a screen body comprising a cover glass and a substrate glass, the cover glass and the substrate glass each comprising a bonding face and an outer surface opposite to the bonding face; and
a cracking prevention layer provided on the outer surface of the cover glass and the outer surface of the substrate glass.

2. The display screen according to claim 1, wherein the bonding face of the cover glass is bonded together with the bonding face of the substrate glass.

3. The display screen according to claim 1, wherein the cracking prevention layer completely covers the outer surfaces of the cover glass and the substrate glass.

4. The display screen according to claim 1, wherein a shape of a projection of the cracking prevention layer on a plane of the screen body is identical to a shape of the screen body removing a predetermined slotted region.

5. The display screen according to claim 1, wherein the cracking prevention layer has a portion protruding from an edge of the screen body.

6. The display screen according to claim 1, wherein the cracking prevention layer is adhered to the outer surfaces of the cover glass and the substrate glass.

7. The display screen according to claim 1, wherein the cracking prevention layer is an adhesive tape layer, an adhering layer formed by stacking a glue layer and a metal layer, or a mixed layer formed by mixing glue and a metal material.

8. The display screen according to claim 1, wherein the cracking prevention layer is an adhering layer formed by stacking a glue layer and a metal layer, the metal layer is a metal mesh layer or a metal sheet layer.

9. The display screen according to claim 1, further comprising an intermediate layer interposed between the bonding surfaces of the cover glass and the substrate glass.

10. A display screen, wherein the display screen is manufactured by a method, the method comprising:
providing a cover glass and a substrate glass, the cover glass and the substrate glass each comprising a bonding face and an outer surface opposite to the bonding face, the cover glass and the substrate glass each having a predetermined slotted region, respectively;
providing cracking prevention layers on the outer surfaces of the cover glass and the substrate glass, respectively; and
performing a slotting operation at the predetermined slotted region to form a mounting slot.

11. The display screen according to claim 10, wherein the bonding face of the cover glass is bonded together with the bonding face of the substrate glass.

12. The display screen according to claim 10, wherein the cracking prevention layers completely cover the outer surfaces of the cover glass and the substrate glass.

13. The display screen according to claim 10, wherein a shape of a projection of the cracking prevention layers on a plane of the cover glass is identical to a shape of the cover glass removing a predetermined slotted region.

14. The display screen according to claim 10, wherein the cracking prevention layers have a portion protruding from an edge of the cover glass.

15. The display screen according to claim 10, wherein the cracking prevention layers are adhered to the outer surfaces of the cover glass and the substrate glass.

16. The display screen according to claim 10, wherein the cracking prevention layers comprise an adhesive tape layer, an adhering layer formed by stacking a glue layer and a metal layer, or a mixed layer formed by mixing glue and a metal material.

17. The display screen according to claim 10, wherein the cracking prevention layers comprise an adhering layer formed by stacking a glue layer and a metal layer, the metal layer is a metal mesh layer or a metal sheet layer.

18. The display screen according to claim 10, further comprising an intermediate layer interposed between the bonding surfaces of the cover glass and the substrate glass.

* * * * *